(No Model.)
J. C. DUPEE.
BRAZING APPARATUS.
No. 585,641. Patented June 29, 1897.
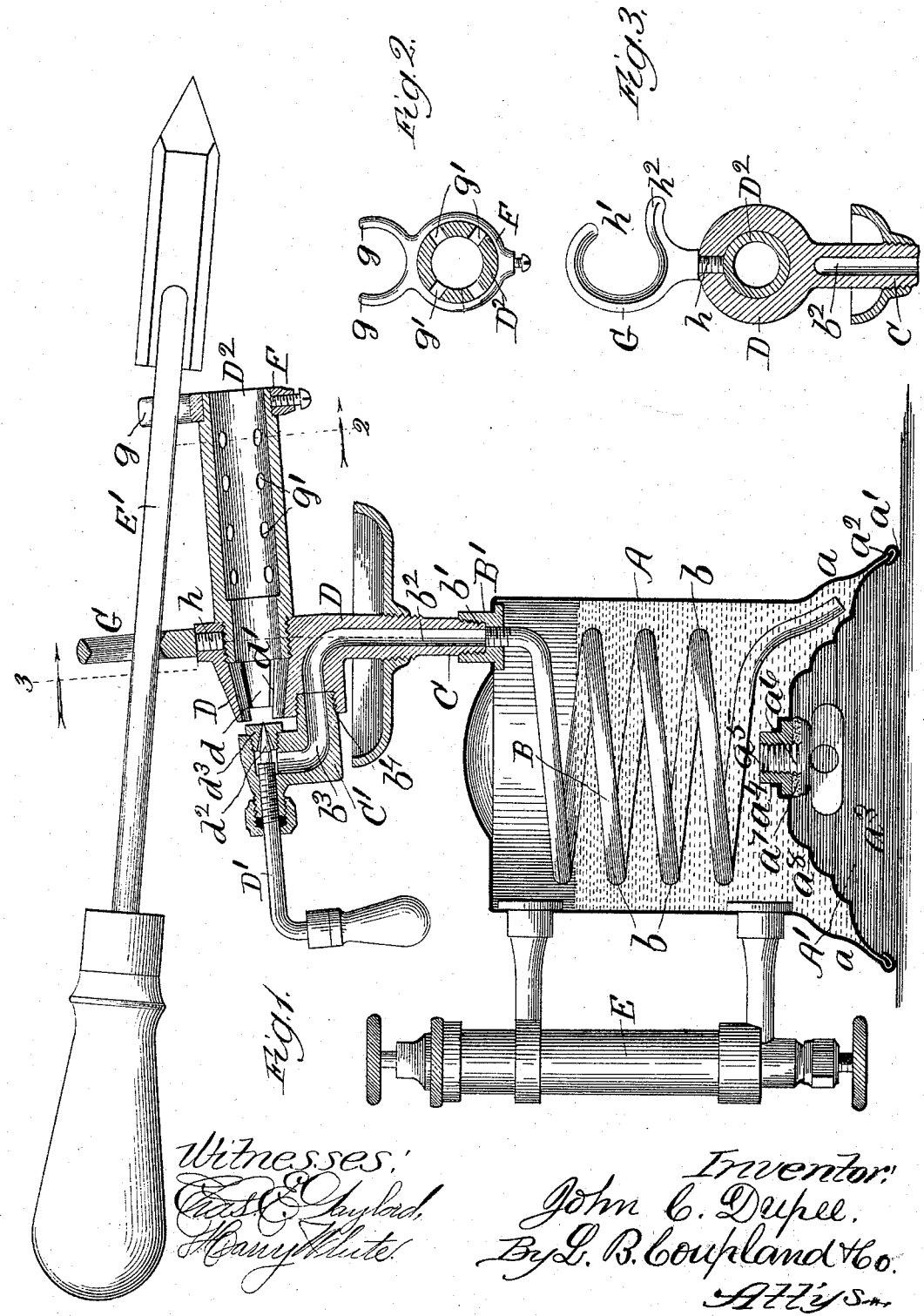

UNITED STATES PATENT OFFICE.

JOHN C. DUPEE, OF CHICAGO, ILLINOIS, ASSIGNOR OF ONE-HALF TO RIPLEY J. WHITE, OF SAME PLACE.

BRAZING APPARATUS.

SPECIFICATION forming part of Letters Patent No. 585,641, dated June 29, 1897.

Application filed April 20, 1896. Serial No. 588,237. (No model.)

*To all whom it may concern:*

Be it known that I, JOHN C. DUPEE, a citizen of the United States, residing at Chicago, in the county of Cook and State of Illinois, have invented certain new and useful Improvements in a Brazing Apparatus; and I do hereby declare the following to be a full, clear, and exact description of the invention, such as will enable others skilled in the art to which it appertains to make and use the same.

This invention relates to improvements in that class of devices that are used for soldering, brazing, and other analogous purposes, and has for its object to provide an apparatus of this character that is durable in construction and efficient and economical in operation.

Figure 1 is a part elevation and part section of a device embodying my improved features; Fig. 2, a section on line 2, Fig. 1, looking in the direction indicated by the arrow; and Fig. 3, a section on line 3, Fig. 1.

A represents a closed tank or reservoir for holding the usual gas-generating liquid fuel and air under pressure. The work parts comprised in the apparatus are connected to this tank, which is preferably of a cylindrical form and is so constructed as to safely stand any pressure practical working may require. The diameter of the tank is somewhat enlarged as it nears the lower end, the side wall being corrugated, as at $a$, and the terminal lower edge $a'$ turned inwardly and made to overlap the joining edge $a^2$ of the conical bottom part A' and brought to a close bearing and then soldered from the outside, forming a perfectly tight and durable joint. The conical bottom extends inwardly and is provided with a series of corrugations $a^3$, which greatly adds to the strength and durability of the bottom structure. The apex of the conical bottom is provided with an opening in which is firmly secured a seat $a^4$, having a filling-passage $a^5$ therethrough, in which is removably inserted a screw-plug or stopple $a^6$.

A packing-ring $a^7$ is inserted between the seat $a^4$ and the flanged shoulder $a^8$ on the screw-plug, closing the filling-passage, and forms a tight joint between the meeting surfaces, so that there is no possibility of the gasolene or other liquid escaping.

When charging the tank with liquid, it is inverted and the closing-plug removed. The conical bottom forms a funnel and permits of the tank being rapidly filled from any kind of a rapidly-flowing open-mouthed vessel. Another advantage of the conical bottom is that by having the filling-opening in the apex of the cone the tank can only be filled up to that point, thus leaving sufficient air-space for working purposes without guessing, as the air-space will be provided for between the apex and the lowest part of the bottom proper.

The feed-pipe B, located on the interior of the tank, is formed in a series of coils $b$. The lower end of this pipe opens near the bottom, the upper end being inserted in a tubular plug B', fixed in the top of the tank. By forming the feed-pipe in a series of coils it will hold a larger volume of liquid and permit of the device being used in an inverted position for a longer time than if the feed-pipe were straight, it being necessary sometimes to invert the device in order to bring the flame in contact with the surface being operated upon.

The lower end of a tubular connection C has a screw-threaded engagement with the plug B', as at $b'$. The passage $b^2$ in the connection C communicates with the passage $b^3$ in the valve part C', which has a threaded engagement with the extension C, as at $b^4$. The upper end of extension C terminates in the enlarged part D and provides a mixing-chamber $d$. A number of slots $d'$ provide for the admission of air into the chamber $d$.

D' is the usual valve-rod, common in this class of devices, and is provided with the conical needle-pointed valve $d^2$, extending into the removable valve-seat $d^3$, which has a liquid-conducting passage therethrough communicating with the air-mixing chamber $d$, the feed being regulated by means of the valve in accordance with the size of the flame required. The enlarged part D, inclosing the mixing-chamber $d$, is contracted at the receiving end and gradually increases in diameter to where it connects with the burner-tube $D^2$.

The mixing-chamber being of a variable diameter provides for a gradual expansion of the generated gas and a more thorough homogeneous admixture with the incoming volume of air. The longitudinal slots admit the air-supply continuously from end to end, so that the union of the combustible elements is more perfect and produces a hotter flame than if the wall of the mixing-chamber were provided with round holes.

The pump attachment E for supplying air under pressure in the tank is of the same construction as set forth in my application, Serial No. 554,702, filed July 2, 1895. A detailed showing and description is therefore omitted.

This apparatus is much used in the open air and is provided with means for holding soldering-tools in position to be heated, as will be next described.

A ring F, Fig. 2, is removably mounted on the burner-tube $D^2$, and is provided with prongs $g\ g$, between which the tool is supported.

$g'$ represents air-openings.

A bracket-ring G is provided with a threaded stem $h$, which is inserted in the enlarged part D, Fig. 3, of the extension C. This ring is open on one side, as at $h'$, for the convenient insertion and removal of the soldering-tool. The projecting prong $h^2$ also facilitates the insertion of the tool in the rest.

When the tool is moved forward far enough so that the soldering end will tip up the handle end, it comes in contact with the inside top of ring G and is held in that position, thus bringing the tool more directly into the flame and heating it somewhat quicker than when resting in the ordinary position shown in Fig. 1. This tool-supporting attachment dispenses with the services of one person and otherwise greatly facilitates the operation, as the tool is held steadily in the flame.

Having thus described my invention, what I claim as new, and desire to secure by Letters Patent, is—

1. In a brazing apparatus, the combination with a liquid-fuel tank, of an air-pump connected therewith, a burner, and a coiled pipe, extending nearly to the bottom of said tank and conducting the liquid fuel therefrom to said burner, substantially as described.

2. In a brazing apparatus, the combination with the burner-tube, of a ring, provided with prongs, $g\ g$, and mounted on said tube, the part, D, and a bracket-ring, open on one side and provided with a threaded stem, substantially as described.

In testimony whereof I affix my signature in presence of two witnesses.

JOHN C. DUPEE.

Witnesses:
L. M. FREEMAN,
L. B. COUPLAND.